Dec. 17, 1957　　O. SHUFFMAN　　2,816,741
MANUFACTURE OF EXPANDED MATERIALS
Filed May 7, 1954　　3 Sheets-Sheet 1

INVENTOR.
OSCAR SHUFFMAN
BY Charles H. Brown
ATTORNEY

Dec. 17, 1957     O. SHUFFMAN     2,816,741
MANUFACTURE OF EXPANDED MATERIALS
Filed May 7, 1954     3 Sheets-Sheet 2
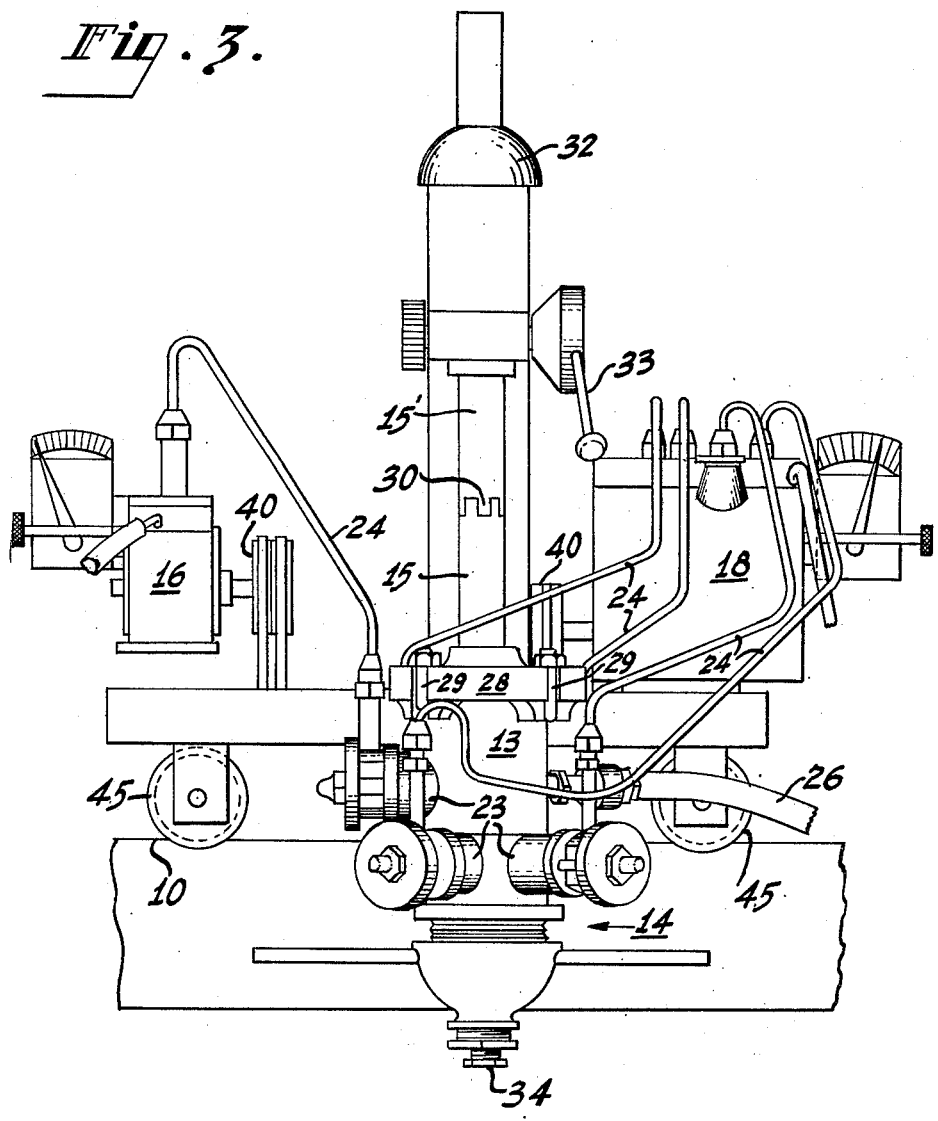
INVENTOR.
OSCAR SHUFFMAN
BY Charles H. Brown
ATTORNEY

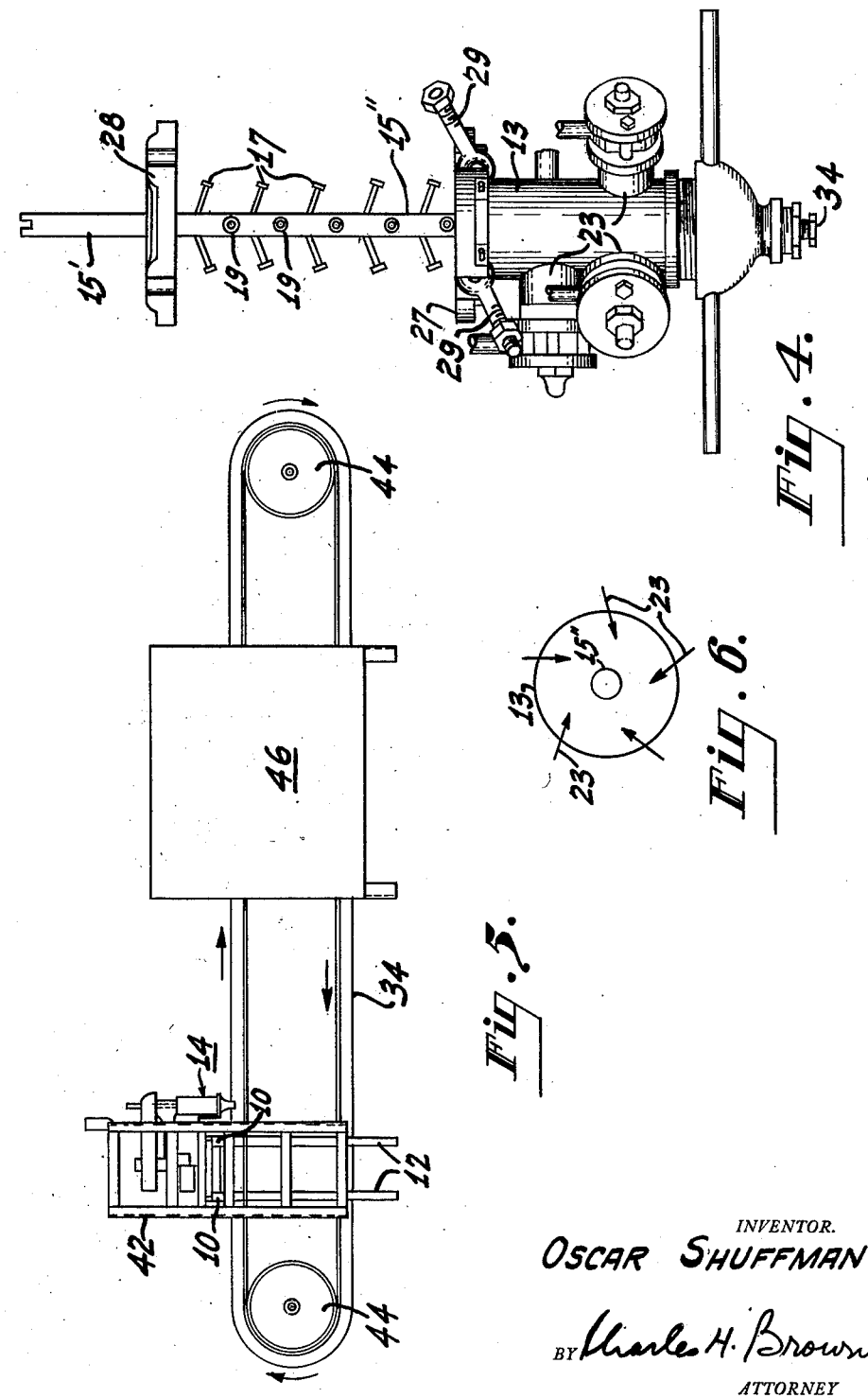

_United States Patent Office_ 2,816,741
Patented Dec. 17, 1957

2,816,741

MANUFACTURE OF EXPANDED MATERIALS

Oscar Shuffman, Yonkers, N. Y., assignor to Hudson Foam Plastics Corporation, Yonkers, N. Y., a corporation of New York Application May 7, 1954, Serial No. 428,325

8 Claims. (Cl. 259—8)

This invention relates to an improved method of and means for accurately measuring and mixing the various ingredients of a foamed or expanded material, and dispensing the same in a continuous fluid stream to produce upon hardening a molded foamed product having pronounced flexibility.

The general object of the invention is to provide efficient apparatus suitable for injecting under pressure accurate predetermined quantities of ingredients of a foamed material in sequence into a mixing chamber, thoroughly mixing the ingredients into a homogeneous fluid mass, and dispensing the mass in a continuous stream onto a surface where the mass may harden into a molded resilient product similar to foam rubber.

Another object is to provide a novel machine for the manufacture of expanded foamed products wherein accurately measured amounts of ingredients are sequentially introduced under pressure through multiple inlets into a mixer in which thorough and rapid mixing occurs, and from which a uniform and thoroughly mixed liquid stream is forced out through a single outlet.

In brief, the machine of the invention comprises a mixing chamber having a metallic housing enclosing a rapidly rotating shaft over the length of which are mounted a plurality of pins angularly positioned relative to one another. A multiplicity of inlets in the housing are arranged to introduce the different ingredients into the housing in such manner that they do not directly impinge upon the shaft. These ingredients are injected into the mixing chamber along the periphery thereof in specified predetermined quantities and sequentially to insure thorough mixing. Each inlet has associated therewith a pump for forcing a liquid ingredient therethrough under pressure. The mixed liquids in the chamber are forced out of a discharge orifice at the bottom in such manner as to prevent any possible backing up of the mixed mass into the inlets.

A feature of the invention is the mechanism for causing continuous to-and-fro movement of the mixing chamber and its associated injection pumps on stationary tracks for assuring uniform and continuous dispensing of the mixed liquid mass onto a moving conveyer belt whose speed of travel is coordinated with the movement of the mixing chamber.

Other objects and features will appear from a reading of the following detailed description in conjunction with a drawing wherein:

Fig. 3 is an enlarged view of the mixing chamber of the machine of Figs. 1 and 2, and shows the inlets and injection pumps in greater detail;

Fig. 4 is a fragmentary view of the mixing chamber with the rotatable shaft lifted from the chamber housing to reveal the mixing pins;

Fig. 5 is a view of the machine of Figs. 1 and 2 and associated apparatus for expediting the setting or hardening the foamed or expanded material on the conveyor belt, taken at right angles to the view of Figs. 1 and 2; and Fig. 6 diagrammatically shows the direction of travel of the intermittent streams of ingredients introduced under pressure into the mixer housing.

Figures 1, 2:
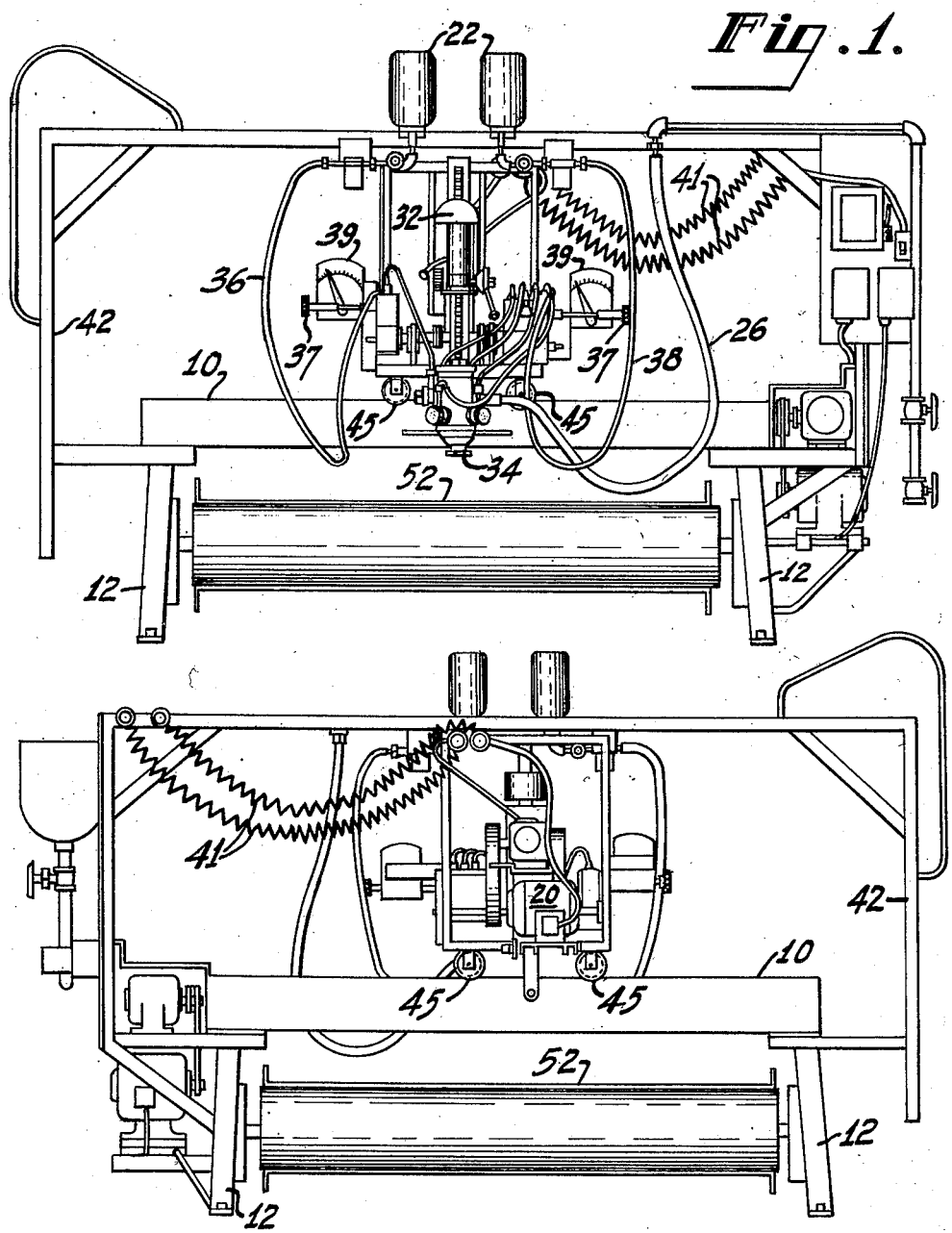
Fig. 1 is a front elevation view of the machine of the invention for mixing and dispensing the ingredients which go into the manufacture of a foamed or expanded material, and shows the supporting frame work, the tracks, and the conveyor belt upon which the thoroughly mixed liquid mass is deposited.
Fig. 2 is a rear elevation view of the machine of Fig. 1.

Referring to the drawing in more detail, the machine for manufacturing the foamed or expanded material includes a stationary support having a pair of metallic tracks or rails 10 supported at both ends by legs 12. Mounted on said tracks 10 for travel thereover in to-and-fro motion is a metallic frame supporting a mixing device 14, injection pumps 16, 18, a motor 20 for driving the pumps, and two reservoirs 22 for supplying ingredients to be injected under pressure into the mixer. This movable frame with its associated equipment is mounted on rollers or wheels 15 which rest on and travel over the tracks or rails 10.

The mixer 14 is shown in more detail in Figs. 3 and 4 and comprises a cylindrical metallic chamber or housing 13 having therein a rotatable shaft 15 to which are fastened two rows of mixing pins or arms 17, 19 angularly disposed relative to each other. These pins pass through the center of the shaft at right angles to the longitudinal axis and are spaced along the length of the shaft. The mixing pins 17 of at least one row are bent slightly downward to assure a more thorough agitation or mixing of the liquid ingredients in the housing as the shaft rotates and a positive discharge of the mixed mass from the orifice 34. The ingredients to be mixed are introduced into the metallic housing by means of multiple inlets 23 positioned at different horizontal levels which are individually secured to the ends of a corresponding number of hollow metallic tubes 24. The other ends of the tubes 24 are secured to and communicate with the injection pumps 16 and 18. The inlets 23 are arranged around the circumference of the housing 13 and have axes which are displaced relative to the longitudinal axis of the housing as a result of which the streams of ingredients injected and directed into the housing under pressure through these inlets do not directly impinge upon the rotating shaft. Fig. 6 diagrammatically shows the directions of travel of the ingredients introduced under pressure into the housing 13 through the multiple inlets 23; stated in another way, the materials delivered into the mixer are injected slightly off-center. A hose 26 of larger diameter than the tubes 23 also serves to inject under pressure an ingredient into the mixer housing. By way of example only, the tubes 24 may each have a ¼" opening while hose 26 has an inch wide opening.

Shaft 15 passes out of the top of the housing 13 through a metallic cap 28 and is linked by a coupling 30 to an extension 15', in turn, driven by a motor housed in a casing 32. The cap 28 is fastened to a flange 27 at the top of the housing 13 by means of a plurality of nut and bolt combinations 29. When the motor in casing 32 is not running, the shaft 15 can be lifted out of the mixer together with its mixing pins and arms, and cap 28, by turning a handle 33 which, in turn, is linked to the extension 15 in a manner well known in the drill press art.

At the bottom of the housing 13 and in proximity to inlets 23, is a discharge orifice 34 through which passes in liquid form the thoroughly mixed mass of ingredients previously introduced into the mixer.

Pumps 16 and 18 serve to sequentially inject under pressure into tubes 24 accurately measured predetermined small amounts of ingredients at precisely timed intervals for introduction into the mixer through inlets 23. These pumps may be of any well known kind, as for example the American Bosch fuel injection pump which is of the constant-stroke, cam-actuated, lapped plunger type. The purpose of these pumps is to meter the fuel or liquid to be supplied by them accurately and to deliver it precisely at a definite moment in a definite time under high pressure to the discharge tubes 24 which communicate with the pumps through the well known union nuts. Pump 16 is a single cylinder pump, while pump 18 is a four-cylinder pump. Pump 16 draws its fluid ingredients from one of the supply reservoirs 22 over hose 36 while pump 18 draws its fluid ingredients from the other supply reservoir 22 over hose 38. Each pump has a control knob 37 for adjusting the amount or volume of material delivered by the pump at each stroke of the plunger. A dial and pointer arrangement 39 indicates the relative amount of material delivered at each stroke of the pump. Each pump is driven by a shaft from a pulley 40 which is linked by a pair of belts, to the drive motor 20.

The electric current for the motors on the movable frame is supplied to the motors over coiled insulated wire cables 41. The coiled arrangement of the cables provides sufficient slack to permit the frame to move back and forth over rails 10 without exerting a pulling action on the electric cables.

At one end of the supporting framework 10, 12 is a ladder-like structure 42 for enabling the operator of the machine to climb to the top and fill the reservoirs.

Under the tracks or rails 10 is an endless conveyer belt 52 upon which the uniformly and thoroughly mixed fluid mass is dispensed from the discharge orifice 34 of the mixing chamber. The mixed material is forced out of orifice 34 under pressure of all of the pumps, and the pressures and the design of the machine are such that the ingredients are prevented from backing up into any inlet. Conveyer belt 52 extends over substantially the entire distance between oppositly positioned legs 12 and travels over a pair of rollers 44 spaced apart by a distance anywhere in the range of 20 to 60 feet. The conveyer belt of the machine is shown provided with side walls which may be of any suitable type well known in the art. These side walls may be of the segmented or overlapping type and serve to confine or contain the fluid contents deposited upon the moving belt until the foam or expanded material sets or hardens. Since conveyer belts of this general type are well known in industry and no claim is made to the belt per se, it is not believed necessary to describe such belts in any greater detail. The side walls of the conveyer belt may be waxed or suitably treated to prevent the foamed material from adhering thereto. Intermediate both end rollers 44 is an oven 46 through which the conveyer belt and its contents pass. This oven is heated to a desired temperature to expedite the setting of the foamed or expanded product. The speed of travel of the conveyer belt is coordinated with the two-and-fro motion of the mixer, and the length of the belt and the temperature of the oven also correlated so that the resultant expanded resilient product is as wide as the distance between the walls of the conveyer belt and at least as high as such walls.

As an example of the kind of ingredients which may be introduced under pressure into the machine of the invention to produce an expanded material having pronounced flexibility, the pump 16 can deliver a catalyst and water in the proportion of 1-1½ percent, the pump 18 can deliver a di-isocyanate in the proportion of about 24%, while the hose 26 can deliver a polyester resin in the proportion of 75%.

The multiple angular introduction of the same material into the mixing chamber in small amounts at different levels compared to the introduction thereof through a single inlet insures more uniform and thorough mixing of the ingredients at a high rate of speed, the mixture of ingredients passing immediately to the orifice of the housing which is in proximity to the inlets. Thus, an improved expanded product results from the reaction of the polyester resins with the di-isocyanate in the presence of the catalyst.

What is claimed is:

1. Apparatus for mixing a plurality of liquid chemical ingredients rapidly reactive with each other to form a foamed, expanded material comprising a cylindrical mixing chamber, a plurality of circumferentially spaced inlets in the side wall of said chamber for respectively admitting said liquid ingredients into the interior of said mixing chamber, a restricted orifice at the bottom of said chamber located in close proximity to said inlets, a rotatable shaft extending along the longitudinal axis of said chamber, pins projecting radially from said shaft and located in close proximity to said inlets and said orifice, means for rotating said shaft, and means for sequentially injecting under pressure predeterimned amounts of said liquid ingredients through said inlets into said chamber wherein said liquid ingredients are rapidly and thoroughly mixed with each other by the rotating pins and the mixture of liquid ingredients is rapidly discharged from said chamber through said restricted orifice.

2. Apparatus as in claim 1 and further including an endless conveyor with the upper run thereof located beneath and in close proximity to the restricted orifice of said chamber, and means for mounting said mixing chamber for to-and-fro movement transversely of the movement of said conveyor whereby the mixture of liquid ingredients is rapidly deposited on said conveyor.

3. Apparatus for mixing a plurality of liquid chemical ingredients rapidly reactive wtih each other to form a foamed, expanded material, comprising a cylindrical mixing chamber, a plurality of circumferentially spaced inlets on the side wall of said chamber for respectively admitting said liquid ingredients into said chamber, the axes of said inlets being arranged to pass the streams of said liquid ingredients in displaced relation to the longitudinal axis of said chamber, a restricted orifice at the botttom of said chamber located in close proximity to said inlets, a rotatable shaft extending along the longitudinal axis of said chamber, rows of pins projecting radially from said shaft and located in close proximity to said inlets, at least one of the rows of pins being inclined downwardly toward said shaft, means for rotating said shaft, and means for sequentially injecting under pressure predetermined amounts of the respective liquid ingredients through said inlets into said chamber wherein said injected ingredients are rapidly and thoroughly mixed with each other and the liquid mixture is rapidly discharged from said chamber through said restricted orifice.

4. Apparatus as in claim 1 wherein said injecting means comprises pumps operating under high pressure to inject into said chamber metered small amounts of said liquid ingredients at precisely timed intervals.

5. Apparatus as in claim 4 wherein said inlets are at different horizontal levels and one of said inlets has a diameter substantially larger than that of the other inlets.

6. The method of mixing a plurality of liquid chemical ingredients rapidly reactive with each other to form a foamed, expanded material, comprising introducing under pressure streams of said liquid ingredients into a common mixing chamber, the axes of said streams being displaced relative to the longitudinal axis of said chamber, rapidly and thoroughly mixing said ingredients at a point in close proximity to their point of entry into said chamber, and rapidly discharging said mixture from said chamber through a restricted orifice located at a point in close proximity to the points of entry of said streams of ingredients into said chamber and in close proximity to the mixing point of said streams of ingredients, whereby said streams of ingredients are rapidly mixed and rapidly discharged from said chamber while still in a liquid state.

7. The method as in claim 6 wherein said discharged liquid mixture is continuously deposited on a moving conveyor in close proximity to said restricted orifice, said mixing chamber being reciprocably moved in directions transversely of the direction of movement of said conveyor.

8. In combination, means for rapidly and thoroughly mixing a plurality of liquid chemical ingredients rapidly reactive with each other to form a foamed, expanded material, comprising a cylindrical mixing chamber having a plurality of circumferentially spaced inlets in the side wall thereof, a restricted orifice in the bottom wall of said chamber located in close proximity to said inlets, a rotatable shaft within said chamber, pins projecting radially from said shaft towards said inlets and in close proximity thereto, means for rotating said shaft, and pump means for introducing said liquid ingredients under pressure into said chamber through said inlets, said pump means comprising one single cylinder pump for successively injecting accurately measured small amounts of one liquid ingredient at precisely timed intervals through one of said inlets, and a multicylinder pump for sequentially injecting accurately measured small amounts of a second ingredient at precisely timed intervals through other inlets, a further inlet being of a diameter substantially larger than that of the other inlets for admitting a third ingredient for rapid admixture with said first and second mentioned ingredients.

References Cited in the file of this patent

UNITED STATES PATENTS

| | | |
|---|---|---|
| 1,102,696 | Shiner | July 7, 1914 |
| 1,117,670 | Hay | Nov. 17, 1914 |
| 1,233,023 | Buddecke | July 10, 1917 |
| 1,466,639 | Browne | Aug. 28, 1923 |
| 1,941,808 | McConnaughay | Jan. 2, 1934 |
| 2,033,412 | Chapman | Mar. 10, 1936 |
| 2,074,673 | Sackett | Mar. 23, 1937 |
| 2,446,373 | Klein | Aug. 3, 1948 |
| 2,464,523 | Muench | Mar. 15, 1949 |